H. J. HIPPLE.
NUT AND BOLT LOCK.
APPLICATION FILED AUG. 30, 1911.
1,049,234.
Patented Dec. 31, 1912.
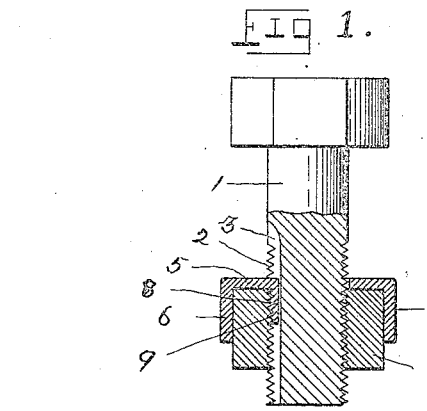
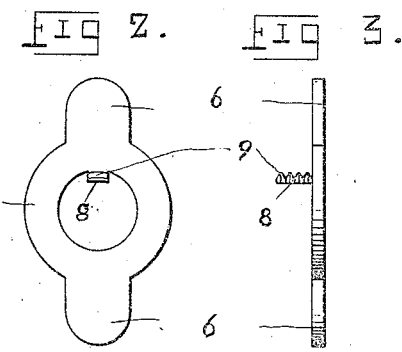
WITNESSES
INVENTOR
Harvey J. Hipple,
BY
ATTORNEY

UNITED STATES PATENT OFFICE.

HARVEY J. HIPPLE, OF LANCASTER, PENNSYLVANIA.

NUT AND BOLT LOCK.

1,049,234. Specification of Letters Patent. Patented Dec. 31, 1912.

Application filed August 30, 1911. Serial No. 646,907.

*To all whom it may concern:*

Be it known that I, HARVEY J. HIPPLE, a citizen of the United States, residing at Lancaster, in the county of Lancaster and State of Pennsylvania, have invented certain new and useful Improvements in Nut and Bolt Locks, of which the following is a specification, reference being had therein to the accompanying drawing.

This invention relates to a bolt and nut lock of that class where it is intended to secure the nut upon the bolt in such a way as to prevent its becoming loosened, and it relates more particularly to that class of bolts used on railroad rails, where it is important to have a device of this class that shall not only be effective but capable of repeated use.

The object of the invention is to provide a lock bolt and nut of this class that shall be cheap, durable and efficient and capable of repeated use.

Another object of the invention being to provide a novel locking means which shall not reduce the strength of the bolt.

Still another object being to provide an article of this kind that is not only capable of preventing the loosening of the nut, but which may be used as a stop and set at a predetermined place upon the bolt to prevent the nut from being set up and tightened.

With these and other objects in view, my invention consists in certain construction and combination of parts as will hereinafter be fully described and claimed in the annexed specification and illustrated in the accompanying drawings which form a part of this application and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is a side elevation of a bolt and nut partly in section embodying my invention. Fig. 2, is a plan view of the lock washer. Fig. 3, is a side elevation of the same.

Referring to the drawings, the invention comprises the usual bolt 1, provided with the threads 2, and having a longitudinal key-way 3, and the usual nut 4.

The locking device consists of a washer 5, of semi-flexible material such as soft steel and is formed with the ears 6, and the key 8, which allows the washer 5, to be placed upon the bolt 1, and prevented from turning thereon by the key 7, engaging the key-way 3.

When the nut 4 is drawn up to the required place, the ears 6, are bent over upon the sides of the nut 4, and will thus prevent the nut 4, from turning upon the bolt, as shown in Fig. 1, and yet the ears 6, may be straightened out and the nut removed; and this operation may be repeated a great many times before the ears will become weakened.

As shown in Figs. 1, 2, and 3, the key 8 is bent at right angles to the washer 5, and provided with the screw-threads 9, in such a way that when the same is placed upon the bolt, the threads 9, will register with the threads of the bolt, and in this manner the washer may be set at any desired place upon the bolt and when the nut is drawn up and engages the threads 9, on the key 8, the washer will serve as a stop and prevent the nut from going farther on the bolt.

Having thus described my invention what I claim as new and desire to secure by Letters Patent is:—

In a nut lock of the class described, the combination with a bolt and a nut, said bolt being provided with a longitudinal key-way, of a washer adapted to fit over said bolt, a key formed on said washer and adapted to engage said key-way, threads formed on said key, the threads of said key adapted to be engaged by the nut to prevent said washer from sliding on said bolt, of ears formed on said washer and adapted to be bent to engage the surface of said nut to prevent the same from turning on said bolt.

In testimony whereof I affix my signature in presence of two witnesses.

HARVEY J. HIPPLE.

Witnesses:
WM. J. COULTER,
MABEL L. LEFEVRE.